United States Patent Office 3,819,703
Patented June 25, 1974

3,819,703
α-AMINO-α-ACYL-CARBONYL-PHENYL-
HYDRAZONES
Wilfried Draber and Karl-Heinz Buchel, Wuppertal-Elberfeld, Ingeborg Hammann, Cologne, and Paul-Ernst Frohberger, Leverkusen, Germany, assignors to Bayer Aktiengesellschaft, Leverkusen, Germany
No Drawing. Filed Mar. 20, 1972, Ser. No. 236,450
Claims priority, application Germany, Mar. 23, 1971,
P 21 13 997.9
Int. Cl. C07c 123/00
U.S. Cl. 260—564 R 6 Claims

ABSTRACT OF THE DISCLOSURE

α-amino-α-acyl-carbonyl-phenylhydrazones of the general formula

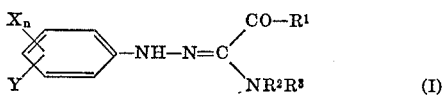

in which

X and Y each independently is hydrogen, alkyl, cycloalkyl, halogen, nitro or haloalkyl,
$n$ is 1, 2 or 3,
$R^1$ and $R^2$ each independently is lower alkyl, and
$R^3$ is hydrogen or lower alkyl, or
$R^2$ and $R^3$ together with the nitrogen atom to which they are attached form a heterocyclic ring, which possess insecticidal, acaricidal and fungicidal properties.

---

The present invention relates to and has for its objects the provision of particular new α-amino-α-acyl-carbonyl-phenylhydrazones, i.e. α-substituted amino-α-lower acyl-carbonyl-phenylhydrazones optionally substituted on the phenyl ring, which possess insecticidal, acaricidal and fungicidal properties, active compositions in the form of mixtures of such compounds with solid and liquid dispersible carrier vehicles, and methods for producing such compounds and for using such compounds in a new way especially for combating pests, e.g. insects, acarids and fungi, with other and further objects becoming apparent from a study of the within specification and accompanying examples.

It has been disclosed in U.S. Pat. 3,157,569 and Netherlands Published Patent Application 6,813,353 that some phenylhydrazones of dicyanoketone, for example α,α-dicyanocarbonyl - 2,5 - dichlorophenylhydrazone (Compound A), and of 1,2-dicarbonyl compounds, for example α-cyano-α-acetyl - carbonyl - 4 - chlorophenylhydrazone (Compound B) and α-nitro-α-acetyl-carbonyl-4-chloro-phenylhydrazone (Compound C), can be used for combating insects, mites and nematodes. However, their action is not always entirely satisfactory if low concentrations are used. It is also known from German Patent Specification 1,133,178 that 4-dialkylaminoarylhydrazones of 1,2-dicarbonyl compounds and 1,2,3-tricarbonyl compounds possess fungicidal properties.

The present invention provides, as new compounds, the phenylhydrazones of the general formula

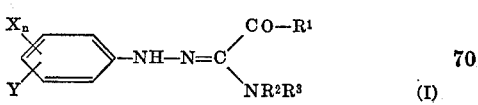

in which

X and Y each independently is hydrogen, alkyl, cycloalkyl, halogen, nitro or haloalkyl,
$n$ is 1, 2 or 3,
$R^1$ and $R^2$ each independently is lower alkyl, and
$R^3$ is hydrogen or lower alkyl, or
$R^2$ and $R^3$ together with the nitrogen atom to which they are attached form a heterocyclic ring.

Preferably, in the above formula (I), X and Y are each hydrogen, branched or straight-chain alkyl with up to 4, preferably up to 3 carbon atoms (especially methyl), trihalomethyl (especially trifluoromethyl), cyclohexyl, nitro or halogen (especially chlorine); $n$ is preferably 1 or 2. $R^1$ is preferably a branched or straight-chain alkyl with up to 4, preferably up to 3 carbon atoms (especially methyl). Preferably, $R^2$ and $R^3$ are each branched or straight-chain alkyl with 1 to 4, preferably 1 to 3 carbon atoms (especially methyl), $R^3$ alternatively being hydrogen, or $R^2$ and $R^3$, together with the nitrogen atom to which they are shown attached, form a 6-membered heterocyclic ring, which may contain at least one further hetero-atom, such as nitrogen, oxygen or sulfur.

The present invention also provides a process for the preparation of a phenylhydrazone of the formula (I) in which an α-chloro-α-acylcarbonyl-phenylhydrazone of the general formula

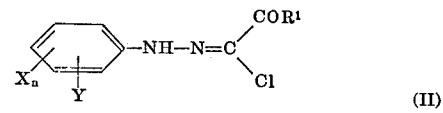

in which

X, Y, $n$ and $R^1$ have the meanings stated above, is reacted with an amine of the general formula

in which $R^2$ and $R^3$ have the meanings stated above, in the presence of an acid-binding agent and, if required, of a diluent which includes a solvent.

Surprisingly, the phenylhydrazones according to the present invention show a considerably higher insecticidal and acaricidal activity than the α-cyano-α-acetyl- and α-nitro-α-acetyl-carbonyl-4-chlorophenylhydrazones of the prior art, which are the chemically closest active substances of the same direction of activity. The compounds according to the present invention thus represent an enrichment of the art. Additionally, the active substances of this invention show a very good fungitoxic action.

If α - chloro-α-acetylcarbonyl-4-chlorophenylhydrazone and dimethylamine are used as starting materials, the course of the reaction can be represented by the following equation:

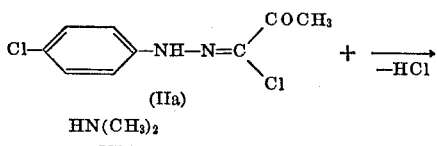

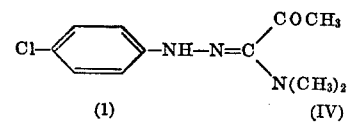

The starting materials (II) and (III) used for the preparative process are known and (II) can be prepared in a simple manner by known processes such as described in Netherlands Patent Application 6,813,353.

Suitable diluents for use in the preparation of the phenylhydrazones of the formula (I) are polar organic solvents, especially alcohols, such as methanol, ethanol, propanol and isopropanol, and ethers, such as diethyl ether and tetrahydrofurane.

The reaction is carried out in the presence of an acid-binding agent. Conveniently, an appropriate excess of the amine (III) used is employed. However, it is also possible to add an inorganic acid-binding agent, such as an alkali metal carbonate or alkaline earth metal carbonate. The reaction temperatures can be varied over a fairly wide range: in general, the process is carried out at from about 10° C. to 70° C., preferably at from about 20° C. to 50° C.

In carrying out the process according to the invention, 1 mole of the compound of the formula (II) is preferably reacted with about 2 moles of amine, 1 mole of amine being consumed as the acid-binding agent.

To isolate the compounds of the formula (I), the resulting precipitate is filtered off and purified by rinsing. Additional product can be isolated from the filtrate by concentration.

The following may be mentioned as individual examples of the new active compounds:

(1) α-Dimethylylamino-α-acetylcarbonyl-4-chlorophenylhydrazone,
(2) α-Methylamino-α-acetylcarbonyl-4-chlorophenylhydrazone,
(3) α-Methylamino-α-acetylcarbonyl-3-chlorophenylhydrazone,
(4) α-Methylamino-α-acetylcarbonyl-phenylhydrazone,
(5) α-Dimethylamino-α-acetylcarbonyl-2-chloro-5-trifluoromethyl-phenylhydrazone,
(6) α-Methylamino-α-acetylcarbonyl-2-chloro-6-methylphenylhydrazone,
(7) α-Dimethylamino-α-acetylcarbonyl-3-chlorophenylhydrazone,
(8) α-Dimethylamino-α-acetylcarbonyl-2,4-dichlorophenylhydrazone,
(9) α-Dimethylamino-α acetylcarbonyl-2,4,5-trichlorophenylhydrazone,
(10) α-Methylamino-α-acetylcarbonyl-2-chlorophenylhydrazone,
(11) α-Morpholino-α-acetylcarbonyl-4-chlorophenylhydrazone,
(12) α-Morpholino-α-acetylcarbonyl-2-chlorophenylhydrazone,
(13) α-Methylamino-α-acetylcarbonyl-2-chloro-5-trifluoromethylphenylhydrazone,
(14) α-Morpholino-α-acetylcarbonyl-4-chloro-2-methylphenylhydrazone,
(15) α-Dimethylamino-α-acetylcarbonyl-2-chlorophenylhydrazone,
(16) α-Dimethylamino-α-acetylcarbonyl-3,5-bis-trifluoromethylphenylhydrazone,
(17) α-Dimethylamino-α-acetylcarbonyl-2-methyl-4-nitrophenylhydrazone, and
(18) α-Diethylamino-α-acetylcarbonyl-3,5-bis-trifluoromethylphenylhydrazone.

The compounds according to the present invention possess an outstanding, rapidly starting and long-lasting activity against insects, Acarina and seed-borne and soil-borne fungal diseases of plants.

Particularly to be emphasized is their activity against resistant strains of mites.

With the mites (Acari) contemplated herein there are classed, in particular, the spider mites (Tetranychidae) such as the two-spotted spider mite (Tetranychus telarius-Tetranychus althaeae or Tetranychus urticae) and the European red mite (Paratetranychus pilosus-Panonychus ulmi), gall mites, for example the black current gall mite (Eriophyes ribis) and tarsonemids, for example the broad mite (Hemitarsonemus latus) and the cyclamen mite (Tarsonemus pallidus); finally, ticks, such as the relapsing fever tick (Ornithodorus moubata); and the like.

To the sucking insects contemplated herein there belong, in the main, aphids (Aphidae) such as the green peach aphid (Myzus persicae), the bean aphid (Doralis fabae), the bird cherry aphid (Rhopalosiphum padi), the pea aphid (Macrosiphum pisi) and the potato aphid (Macrosiphum solanifolii), the current gall aphid (Cryptomyzus korschelti), the rosy apple aphid (Sappaphis mali), the mealy plum aphid (Hyalopterus arundinis) and the cherry black-fly (Myzus cerasi); in addition, scales and mealybugs (Coccina), for example the oleander scale (Aspidiotus hederae) and the soft scale (Lecanium hesperidum) as well as the grape mealybug (Pseudococcus maritimus); thrips (Thysanoptera), such as Hercinothrips femoralis, and bugs, for example the beet bug (Piesma quadrata), the red cotton bug (Dysdercus intermedius), the bed bug (Cimex lectularius), the assassin bug (Rhodnius prolixus) and Chagas' bug (Triatoma infestans) and, further, cicadas, such as Euscelis bilobatus and Nephotettix bipunctatus and the like.

In the case of the biting insects contemplated herein, above all there should be mentioned butterfly caterpillars (Lepidoptera) such as the diamond-back moth (Plutella maculipennis), the gypsy moth (Lymantria dispar), the brown-tail moth (Euproctis chrysorrhoea) and tent caterpillar (Malacosoma neustria); further, the cabbage moth (Mamestra brassicae) and the cutworm (Agrotis segetum), the large white butterfly (Pieris brassicae), the small winter moth (Cheimatobia brumata), the green oak tortrix moth (Tortrix viridana), the fall armyworm (Laphygma frugiperda) and cotton worm (Prodenia litura), the ermine moth (Hyponomeuta padella), the Mediterranean flour moth (Ephestia küniella) and greater wax moth (Galleria mellonella); and the like.

The active compounds according to the invention also exhibit a high degree of fungitoxic activity together with a greath breadth of activity and a relatively low toxicity to warm-blooded animals; therefore they are simple to handle and can be used for the control of undesired fungal growth. Their good toleration by plants also permits an application against fungal plant diseases by treatment of the standing cultivated plant or individual parts thereof, or the seed or the cultivated soil. The active compounds are particularly effective against fungi that cause tracheomycosis and that attack the plants from the soil, such as Verticillium species, Fusarium species and Phialophora species. However, they also act very well against seed-borne fungi, such as Tilletia tritici, Ustilago avenae, Fusarium nivale, Helminthosphorium species, and against soil-inhabiting fungi, such as Rhizoctonia species Fusarium species, Pythium species and Thielaviopsis species.

The active compounds according to the invention can also be used against parasitic fungi on above-the-soil parts of plants. Thus they are effective against fungi of the genera Botrytis and Fusicladium.

The active compounds can, however, also be used with good results for the control of other phytopathogenic fungi, for instance fungi that cause diseases in rice and ornamental plants, particularly Piricularia oryzae, Pellicularia sasakii, Cochliobolus miyabeanus, Cercospora musae and Phialophora cinerescens.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), cycloalkanes (e.g. cyclohexane, etc.), paraffins (e.g. petroleum or mineral oil fractions), chlorinated aliphatic hydrocarbons (e.g. methylene chloride, chloroethylene, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide, etc.), acetonitrile, ketones (e.g. acetone, methyl ethyl ketone, methyl isobutyl ketone, cyclohexanone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.): whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other insecticides, acaricides, and fungicides or rodenticides, bactericides, nematocides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplates those in which the active compound is present in an amount substantially between about 0.01–1% by weight of the mixture. Thus, the present invention contemplates over-all compositions which comprises mixtures of a conventional dispersible carrier vehicle such as (1) a dispersible inert finely divided carried solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent and an amount of the active compound which is effective for the purpose in question and which is generally between about 0.01–95%, and preferably 0.1–95% by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g./hectare, preferably 40 to 600 g./hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combatting or controlling pests, e.g. insects, acarids and fungi, which comprises applying to at least one of correspondingly (a) such insects, (b) such acarids, (c) such fungi, and (d) the corresponding habitat thereof, i.e. the locus to be protected, a correspondingly combative or toxic amount, i.e. an insecticidally, acaricidally or fungicidally effective amount of the particular active compound of the invention alone or together with a carrier vehicle as noted above. The instant formulations or compositions are applied in the usual manner, for instance by squirting, spraying, atomizing, scattering, dusting, fumigating, watering, vaporizing, dry dressing, paste dressing (slurry dressing), moist dressing, wet dressing, and the like.

In the case of dressing, there are applied, in general, about 10 mg. to 10 g., preferably about 50 mg. to 5 g. of active compound per kilogram of seed. In the case of soil treatment, which may be carried out by overall, band or spot application, there is generally required, at the place of intended effect, a concentration of about 1 to 500 g., preferably about 10 to 200 g., of active compound per cubic meter of soil.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

EXAMPLE 1

*Plutella test*

Solvent: 3 parts by weight dimethyl formamide
Emulsifier: 1 part by weight alkylaryl polyglycol ether To produce a suitable preparation of active compound, 1 part by weight of the active compound is mixed with the stated amount of solvent containing the stated amount of emulsifier and the concentrate is diluted with water to the desired concentration.

Cabbage leaves (*Brassica oleracea*) are sprayed with the preparation of the active compound until dew moist and are then infested with caterpillars of the diamondback moth (*Plutella maculipennis*).

After the specified periods of time, the degree of destruction is determined as a percentage: 100% means that all the caterpillars are killed whereas 0% means that none of the caterpillars are killed.

The active compounds, the concentrations of the active compounds, the evaluation times and the results can be seen from Table 1.

TABLE 1

(Plant-damaging insects)
*Plutella* test

| Active compound | | Concentration of active compound in percent | Degree of destruction in percent after 3 days |
|---|---|---|---|
| (C) | 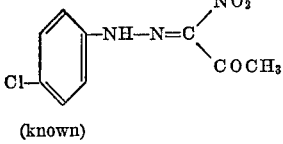 (known) | 0.2 | 0 |
| (4) | 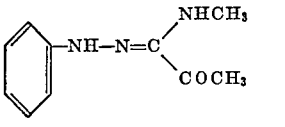 | 0.2 | 100 |
| (2) | 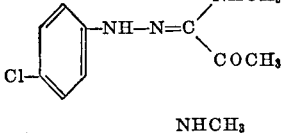 | 0.2 | 100 |
| (3) | 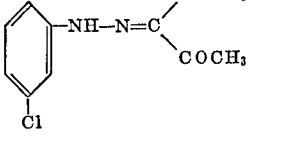 | 0.2 | 100 |
| (1) | 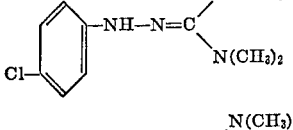 | 0.2<br>0.02<br>0.002 | 100<br>100<br>80 |
| (5) | 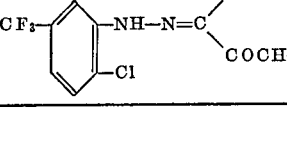 | 0.2 | 100 |

EXAMPLE 2

*Tetranychus* test (against resistant species)

Solvent: 3 parts by weight dimethyl formamide
Emulsifier: 1 part by weight alkylarylpolyglycol ether.

To produce a suitable preparation of active compound, 1 part by weight of the active compound is mixed with the stated amount of solvent containing the stated amount of emulsifier and the concentrate so obtained is diluted with water to the desired concentration.

Bean plants (*Phaseolus vulgaris*), which have a height of approximately 10–30 cm., are sprayed with the preparation of the active compound until dripping wet. These bean plants are heavily infested with spider mites (*Tetranychus urticae*) in all stages of development.

After the specified periods of time, the effectiveness of the preparation of active compound is determined by counting the dead mites. The degree of destruction thus obtained is expressed as a percentage: 100% means that all the spider mites are killed whereas 0% means that none of the spider mites are killed.

The active compounds, the concentrations of the active compounds, the evaluation times and the results can be seen from the following Table 2:

TABLE 2

(Plant-damaging mites)
*Tetranychus* test (resistant)

| Active compound | | Concentration of active compound in percent | Degree of destruction in percent after 2 days |
|---|---|---|---|
| (B) | 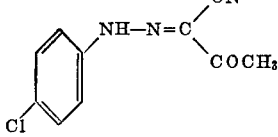 (known) | 0.2 | 0 |
| (D) | 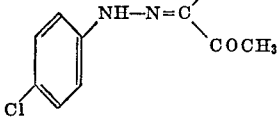 (known) | 0.2<br>0.02 | 80<br>0 |
| (C) | 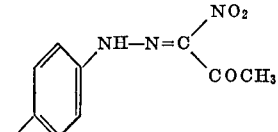 (known) | 0.2 | 20 |
| (6) | 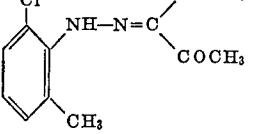 | 0.2<br>0.02 | 100<br>45 |
| (1) | 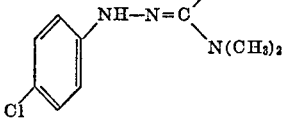 | 0.2<br>0.02 | 100<br>100 |
| (7) | 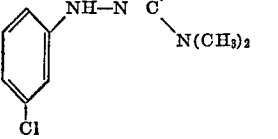 | 0.2<br>0.02 | 95<br>25 |
| (8) | 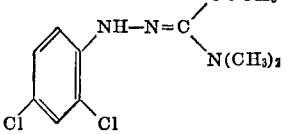 | 0.2<br>0.02 | 100<br>35 |
| (9) | 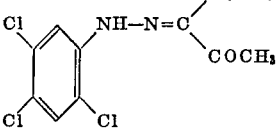 | 0.2<br>0.02 | 100<br>0 |

EXAMPLE 3

Agar plate test

Test for fungitoxic effectiveness and breadth of the activity spectrum.

Solvent: Acetone
Parts by weight: (a) 1000; (b) 100

To produce a suitable preparation of the active compound, 1 part by weight of the active compound is taken up in the stated amount of solvent.

To potato dextrose agar which has been liquefied by heating there is added the preparation of the active compound in such an amount that the desired concentration of active compound is set up therein. After thorough shaking to achieve a uniform dispersion of the active compound, the agar is poured into Petri dishes under sterile conditions. When the mixture of substrate and active compound has solidified, test fungi from pure cultures are inoculated on to it in small discs of 5 mm. diameter. The Petri dishes remain at 20° C. for 3 days for incubation.

After this time, the inhibiting action of the active compound on the mycelium growth is determined in categories, taking into account the untreated control. 0 means no mycelium growth, either on the treated substrate or on the inoculum; the symbol — means mycelium growth on the inoculum only, no spread to the treated substrate; and the symbol + means mycelium growth from the inoculum on to the treated substrate, similar to the spread to the untreated substrate of the control.

The active compounds, the concentration of the active compounds, the test fungi and the inhibition effects achieved can be seen from the following Table:

TABLE 3
Agar plate test

| Active compound | Concentration of active compound in the substrate in mg. per litre | Corticium rolfsii | Sclerotinia sclerotiorum | Verticillium alboatrum | Thielaviopsis basicola | Phytophthora cactorum | Fusarium culmorum | Fusarium oxysporum | Fusarium solani f. pisi |
|---|---|---|---|---|---|---|---|---|---|
| Untreated | | + | + | + | + | + | + | + | + |
| (E) 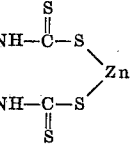 (known) | (b) 100 | + | + | + | 0 | | + | + | + |
| (B) 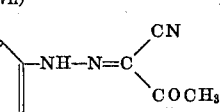 (known) | (a) 10 (b) 100 | + + | + + | + + | + + | + + | + + | + + | + + |
| (10) 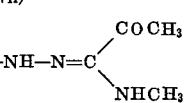 | (b) 100 | 0 | 0 | + | 0 | + | + | — | + |
| (2) 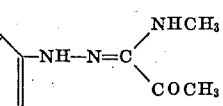 | (b) 100 | 0 | 0 | + | 0 | + | — | 0 | + |
| (3) 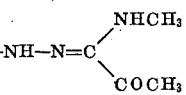 | (b) 100 | 0 | 0 | + | 0 | + | — | — | + |
| (1) 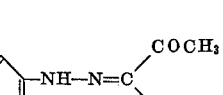 | (b) 100 | 0 | 0 | + | 0 | — | 0 | 0 | + |
| (11)  | (b) 100 | 0 | 0 | + | 0 | + | 0 | + | + |
| (12) 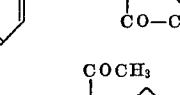 | (b) 100 | 0 | 0 | + | 0 | + | + | + | + |

TABLE 3—Continued

| Active compound | | Concentration of active compound in the substrate in mg. per litre | Corticium rolfsii | Sclerotinia sclerotiorum | Verticillium alboatrum | Thielaviopsis basicola | Phytophthora cactorum | Fusarium culmorum | Fusarium oxysporum | Fusarium solani f. pisi |
|---|---|---|---|---|---|---|---|---|---|---|
| (14) | Cl-phenyl(CH₃)-NH-N=C(COCH₃)-N(morpholino) | (b) 100 | 0 | + | + | 0 | + | + | + | + |
| (7) | Cl-phenyl-NH-N=C(COCH₃)-N(CH₃)₂ | (b) 100 | 0 | 0 | + | — | + | + | + | + |
| (8) | Cl,Cl-phenyl-NH-N=C(COCH₃)-N(CH₃)₂ | (b) 100 | 0 | 0 | + | 0 | 0 | 0 | 0 | + |

EXAMPLE 4

Seed dressing test/stripe disease of barley (seed-borne mycosis)

To produce a suitable dry dressing, the active compound is extended with a mixture of equal parts by weight of talc and kieselguhr to give a finely powdered mixture with the desired concentration of active compound.

To apply the dressing, barley seed, which is naturally infested by *Helminthosporium gramineum*, is shaken with the dressing in a closed glass flask. The seed, on moist filter paper discs in closed Petri dishes, is exposed to a temperature of 4° C. for 10 days in a refrigerator. The germination of the barley, and possibly also of the fungus spores, is thereby initiated. Two batches of 50 grains of the pregerminated barley are subsequently sown 2 cm. deep in Fruhstorfer standard soil and cultivated in a greenhouse at temperatures of about 18° C. in seed boxes which are exposed to light for 16 hours daily. The typical symptoms of the stripe disease develop within 3 to 4 weeks.

After this time, the number of diseased plants is determined as a percentage of the total number of emerged plants. The fewer plants are diseased, the more effective is the active compound.

The active compounds, the concentration of the active compounds in the dressing, the amounts of dressing used and the number of diseased plants can be seen from Table 4:

TABLE 4

| Active compound | Concentration of active compound in the dressing in percent by weight | Applied amount of dressing in g./kg. seed | Number of stripe-diseased plants as a percentage of the total number of emerged plants |
|---|---|---|---|
| Non-dressed | | | 47.8 |
| (E) CH₃-NH-C(=S)-S\Zn/S-C(=S)-NH-CH₃ (known) | 30<br>75 | 2<br>2 | 38.1<br>28.4 |
| (2) Cl-phenyl-NH-N=C(NHCH₃)(COCH₃) | 30 | 2 | 6.8 |
| (3) Cl-phenyl-NH-N=C(NHCH₃)(COCH₃) | 30 | 2 | 5.2 |
| (1) Cl-phenyl-NH-N=C(COCH₃)(N(CH₃)₂) | 3<br>10<br>30 | 2<br>2<br>2 | 10.1<br>3.0<br>0.0 |

TABLE 4—Continued

| Active compound | Concentration of active compound in the dressing in percent by weight | Applied amount of dressing in g./kg. seed | Number of stripe-diseased plants as a percentage of the total number of emerged plants |
| --- | --- | --- | --- |
| (8) ![structure with Cl, Cl, NH-N=C(COCH3)N(CH3)2] | 30 | 2 | 15.5 |
| (11) ![structure with Cl, Cl, NH-N=C(COCH3)-morpholine] | 30 | 2 | 5.3 |

The preparative process of this invention is illustrated in and by the following Example:

EXAMPLE 5

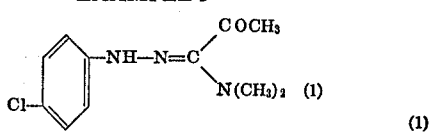

(1)

2.77 kg. (12 moles) of α-chloro-α-acetylcarbonyl-4-chlorophenylhydrazone are suspended in 18.5 liters of ethanol. 1.08 kg. (24 moles) of dimethylamine gas are then introduced while stirring. In the course thereof, the starting material completely dissolves and the temperature rises to about 50° C. Thereafter the mixture is left to cool to room temperature and is stirred for 5–6 hours.

During this time a precipitate is formed which contains the bulk of the product formed. Thereafter this precipitate is filtered off, thoroughly washed with water, dried and recrystallized from cyclohexane. The filtrate is concentrated, whereby a further precipitate is obtained, which is treated in a like manner.

1.95 kg. (68% of theory) of α-dimethylamino-α-acetylcarbonyl-4-chlorophenylhydrazone are obtained as yellow flakes of melting point 102° C.

EXAMPLE 6

The compounds shown in the table that follows are prepared by processes analogous to that above:

TABLE 5

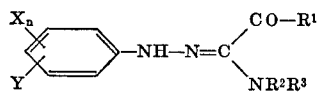

(I)

| Compound number | X | Y | n | R¹ | R² | R³ | Melting point, °C. |
| --- | --- | --- | --- | --- | --- | --- | --- |
| (2) | H | 4-Cl | 1 | CH₃ | CH₃ | H | 104–106 |
| (3) | H | 3-Cl | 1 | CH₃ | CH₃ | H | 106 |
| (4) | H | H | — | CH₃ | CH₃ | H | 85 |
| (5) | 2-Cl | 5-CF₃ | 1 | CH₃ | CH₃ | CH₃ | 82 |
| (6) | 2-Cl | 6-CH₃ | 1 | CH₃ | CH₃ | H | 40–41 |
| (7) | H | 3-Cl | 1 | CH₃ | CH₃ | CH₃ | 106 |
| (8) | 2-Cl | 4-Cl | 1 | CH₃ | CH₃ | CH₃ | 103 |
| (9) | 4,5-Cl₂ | 2-Cl | 2 | CH₃ | CH₃ | CH₃ | 78 |
| (10) | 2-Cl | H | 1 | CH₃ | CH₃ | H | 54–58 |
| (11) | H | 4-Cl | 1 | CH₃ | —N(morpholino) | | 118 |
| (12) | H | 2-Cl | 1 | CH₃ | —N(morpholino) | | 65 |
| (13) | 2-Cl | 5-CF₃ | 1 | CH₃ | CH₃ | H | 124 |
| (14) | 2-CH₃ | 4-Cl | 1 | CH₃ | —N(morpholino) | | 122 |
| (15) | 2-Cl | H | 1 | CH₃ | CH₃ | CH₃ | 109 |
| (16) | 3-CF₃ | 5-CF₃ | 1 | CH₃ | CH₃ | CH₃ | 114 |
| (17) | 2-CH₃ | 4-NO₂ | 1 | CH₃ | CH₃ | CH₃ | 112 |
| (18) | 3-CF₃ | 5-CF₃ | 1 | CH₃ | C₂H₅ | C₂H₅ | 170 |

Other compounds which can be similarly prepared include the following:

α-diisopropylamino-α-butyryl-carbonyl-4-cyclohexyl-phenylhydrazone,
α-pyrrolidino-α-propionylcarbonyl-4-(3-chloropropyl)-phenylhydrazone,
α-imidazol-1-yl-α-butyrylcarbonyl-2,6-diethyl-4-chloro-phenylhydrazone,
α-ethylamino-α-propionylcarbonyl-2,6-diisopropyl-3-nitrophenylhydrazone,
α-(4-methylpiperazino)-α-acetylcarbonyl-2-isopropyl-4-bromophenylhydrazone.

It will be appreciated that the instant specification and examples are set forth by way of illustration and not limitation and that various modifications and changes may be without departing from the spirit and scope of the present invention.

What is claimed is:

1. A phenylhydrazone of the formula $$X_n \text{—}\langle\text{phenyl}\rangle\text{—NH—N=C}\begin{smallmatrix}CO-R^1\\NR^2R^3\end{smallmatrix}$$

in which

X and Y each independently is hydrogen, alkyl of up to 4 carbon atoms, cyclohexyl, halogen, nitro or trihalomethyl, $n$ is 1, 2 or 3, R¹ and R² each independently is alkyl of up to 4 carbon atoms, and R³ is hydrogen or alkyl of up to 4 carbon atoms.

2. A compound according to claim 1 in which X and Y each independently is hydrogen, alkyl of up to 3 carbon atoms, trihalomethyl, cyclohexyl, nitro or chlorine; $n$ is 1 or 2; R¹ is alkyl with up to 3 carbon atoms; and R² and R³ are each alkyl with up to 3 carbon atoms, R³ alternatively being hydrogen.

3. A compound according to claim 1 wherein such compound is α-dimethylamino-α-acetylcarbonyl-4-chlorophenylhydrazone of the formula

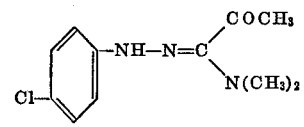

(1)

4. A compound according to claim 1 wherein such compound is α - methylamino-α-acetylcarbonyl-4-chlorophenylhydrazone of the formula

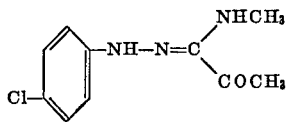

(2)

5. A compound according to claim 1 wherein such compound is α - methylamino-α-acetylcarbonyl-3-chlorophenylhydrazone of the formula

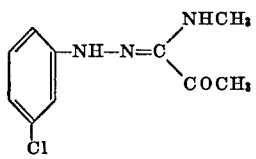

(3)

6. A compound according to claim 1 wherein such compound is α-dimethylamino-α-acetylcarbonyl - 2,4 - dichlorophenylhydrazone of the formula

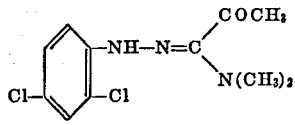

(8)

References Cited
UNITED STATES PATENTS 3,150,151  9/1964  Urbschat et al. ____ 260—566 B
3,636,112  1/1972  Draber et al. _____ 260—566 B LEON ZITVER, Primary Examiner G. A. SCHWARTZ, Assistant Examiner U.S. Cl. X.R.

260—247.5, 268 MK, 309; 424—248, 250, 273, 326